Patented Nov. 13, 1923.

1,473,899

UNITED STATES PATENT OFFICE.

FRIEDRICH BODMAR, OF OSTBAHN, NEAR BERLIN, GERMANY.

METHOD OF PRESERVING WOOD.

No Drawing.   Application filed August 24, 1921.   Serial No. 494,979.

(GRANTED UNDER THE PROVISIONS OF THE ACT OF MARCH 3, 1921, 41 STAT. L., 1313.)

*To all whom it may concern:*

Be it known that I, FRIEDRICH BODMAR, a citizen of Germany, residing at Petershagen a. d. Ostbahn, near Berlin, Germany, have invented certain new and useful Improvements in Methods of Preserving Wood (for which I have filed applications in Germany, December 19, 1913, Pat. 290,186; February 20, 1914, Pat. 278,441; Rumania, December 20, 1920; Poland, 23 January, 1920; Italy, July 9, 1920; Holland, August 11, 1920; Belgium, July 6, 1920; France, July 3, 1920; Finland, September 25, 1918; Czechoslovakia, November 29, 1919; Hungary, October 31, 1917; Sweden, June 25, 1919; England, July 9, 1920; Austria, October 31, 1917; Switzerland, September 28, 1918; Denmark, August 27, 1919; Norway, September 6, 1919), of which the following is a specification.

My invention relates to a means for preserving wood. As is well known to those skilled in the art, mercury chloride is one of the best agents for protecting wood from rotting, its particular feature being that it is readily retained by the wood. This phenomenon is evidently due to the fact that the chloride forms with the wood fibre on the one hand and with the albuminous substances on the other hand, insoluble compounds that cannot be leached out. The precipitated albuminous substances, however, at the same time, envelop a portion of the mercury chloride in unaltered condition, so that it cannot exert its antiseptic effect.

I have now ascertained that this drawback can be overcome by transforming the mercury chloride wholly or partly into complex salts, which, have the property of not coagulating albumen.

Such complex combinations can be produced, according to my investigations, by adding to mercury chloride water-soluble salts containing fluorine, such as sodium fluoride, potassium fluoride, sodium fluosilicate and the like or mixtures of these salts.

If, for example, 9 parts of a 0.6 per cent solution of sodium fluoride are mixed with 6.5 parts of a 0.6 per cent solution of mercury chloride, this mixture in contradistinction to a pure solution of mercury chloride has lost the power of coagulating albumen, particularly that of milk. Even boiling for a comparatively long period has no effect. At the same time, the test with silver nitrate without addition of nitric acid results in a deposit which rapidly assumes a chocolate brown color, while pure mercury chloride at the same ratio of dilution produces only a precipitate of pure white colour.

If the capacity of pure mercury chloride to coagulate albumen shall not be abolished altogether, but only partly this can be effected by reducing the addition of salts containing fluorine.

Instead of pure fluorine salts or fluosilicates mixtures of fluorine salts with fluosilicates soluble in water can be used together with mercury chloride.

If, for example, 20 parts of a 0.6 per cent solution of sodium fluoride are mixed with 5 parts of a 0.6 per cent solution of sodium fluosilicate and 5 parts of a 6 per cent solution of mercury chloride, this mixture has also lost its power of coagulating albumen, particularly that of milk.

The preserving mixture, preferably in form of a 1 to 2 per cent solution can be applied to the wood either by painting or in suitable impregnating vats or boilers, or according to the Boucherie method, or any other process of preserving wood. Impregnation may also be effected in two separate operations, the wood, for instance, being first treated with salts containing fluorine and then with mercury chloride or first with salts containing fluorine and then with a mixture of mercury chloride and salts containing fluorine.

I wish it to be understood that I do not desire to be limited to the exact ingredients and proportions mentioned above, except as recited in the claims, for obvious modifications will occur to a person skilled in the art.

I claim:

1. The method of preserving wood which consists in treating wood with a fluorine compound and mercury chloride.

2. The method of preserving wood which consists in treating wood first with a fluorine compound and then mercury chloride.

3. The method of preserving wood which consists in treating wood with a fluoride and mercury chloride.

4. The method of preserving wood which consists in treating wood with a fluosilicate and mercury chloride.

5. The method of preserving wood which consists in treating wood with a fluoride, a fluosilicate and mercury chloride.

6. The method of preserving wood which consists in treating wood first with a fluoride and a fluosilicate and then with mercury chloride.

7. As a new composition of matter, a solution containing a fluorine compound and mercury chloride.

8. As a new composition of matter, a solution containing a fluosilicate and mercury chloride.

9. As a new composition of matter, a solution containing a fluoride, a fluosilicate and mercury chloride.

In testimony whereof, I affix my signature.

FRIEDRICH BODMAR.